United States Patent [19]
Hirabayashi

[11] Patent Number: 5,903,669
[45] Date of Patent: *May 11, 1999

[54] IMAGE PROCESSING APPARATUS AND METHOD

[75] Inventor: Yasuji Hirabayashi, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/591,154

[22] Filed: Jan. 25, 1996

[30] Foreign Application Priority Data

Jan. 31, 1995 [JP] Japan .................................. 7-014196

[51] Int. Cl.$^6$ .................................................. G06K 9/36
[52] U.S. Cl. ............................................................. 382/232
[58] Field of Search .................................... 348/395, 398, 348/400, 403, 412, 415, 420, 421; 358/432, 433; 382/232, 236, 238, 239, 240, 246, 248, 250

[56] References Cited

U.S. PATENT DOCUMENTS

| | | | |
|---|---|---|---|
| 4,947,447 | 8/1990 | Miyaoka et al. | 382/246 |
| 5,060,285 | 10/1991 | Dixit et al. | 382/240 |
| 5,241,395 | 8/1993 | Chen | 382/239 |
| 5,263,100 | 11/1993 | Kim et al. | 382/239 |

OTHER PUBLICATIONS

IEEE Trans. On Accoustics, Speech and Signal Processing, Strobach, P., "Quadtree–Structured Recursive Plane Decomposition Coding of Images", vol. 39, No. 6, Jun. 1991, pp. 1380–1397.

Image and Multidimensional Signal Processing, Minneapolis, Institute of Electrical and Electronics Engineers, Ramirez, E., et al., Sub–Band Coding of Images With Quadtree–Guided Recursive Polynomial Decomposition, vol. 5, Apr. 1993, pp. 578–581.

*Primary Examiner*—Jose L. Couso
*Attorney, Agent, or Firm*—Fitzpatrick, Cella, Harper & Scinto

[57] ABSTRACT

In compressing an image in units of blocks, the image is compressed in accordance with the size of a redundant portion of the image to increase the compression factor of the image data. An image compression apparatus for encoding an image in units of blocks includes a size discrimination unit for discriminating a block image size suitable for encoding and compressing a predetermined image area, a generation unit for dividing the image area to generate a plurality of block images having different sizes on the basis of the discrimination result of the size discrimination unit, and a compression unit for compressing each block image data representing a block image and generated from the generation unit, on the basis of the size of the block image data.

18 Claims, 8 Drawing Sheets

EXAMPLE OF DIVISION OF BLOCK DATA 102

FIG. 3

DATA FORMAT OF DIVISION
INFORMATION 103

8, 4,  2,2,2,2,   2,1,1,2,   4, 4,  2,1,2,2,  4,   4,

8,

8 : ONE 8×8 PIXEL BLOCK

4 : ONE 4×4 PIXEL BLOCK

2 : ONE 2×2 PIXEL BLOCK

1 : FOUR 1×1 PIXEL BLOCK

IMAGE PROCESSING APPARATUS AND METHOD

BACKGROUND OF THE INVENTION

1. Field of the Invention

The present invention relates to an image processing apparatus and method for encoding image data.

2. Related Background Art

In conventional compression encoding of multi-value data, a block consisting of a plurality of pixels is extracted or formed from image data, and compression encoding is performed in units of blocks. In the JPEG, MPEG, and H.261 schemes as the international standard schemes for image encoding, a block having a predetermined block size of 8 (horizontal)×8 (vertical) pixels is used.

This block data is processed by DCT (Discrete Cosine Transform) to obtain a transform coefficient. This transform coefficient is quantized, and the quantized data is encoded to obtain a variable-length compressed code, e.g., a Huffman code.

This image compression encoding can provide an enhanced compression effect because most of the multi-value natural images have very large redundant portions. The redundant portions include a flat portion obtained when a plurality of adjacent pixel values have close values, and a monotonous gradient portion obtained when most of small areas in an image have monotonous luminance gradients. The average information volume obtained upon DCT operations is decreased because the 0th and 1st DCT bases match the form of a redundant portion, thereby exhibiting a compression effect.

If the formed block is flat or has a monotonous gradient, the compression factor can be increased. Otherwise, the word length increases upon DCT transform, thereby decreasing the compression factor.

As described above, compression coding is conventionally performed in units of blocks each having a size of 8×8 pixels. For this reason, when a block subjected to compression encoding has a large number of redundant portions, the compression factor can be increased. However, when the number of redundant portions is small, the compression factor is decreased. This problem is not limited to encoding using DCT, but also applies to other block encoding schemes such as encoding using a difference value.

SUMMARY OF THE INVENTION

The present invention has been made to solve the conventional problems described above, and has as its object to perform image compression in accordance with the features of an image in compression in units of blocks, thereby increasing the compression factor. More specifically, it is an object of the present invention to locally change the size of an encoding block in accordance with, e.g., the size of a redundant portion in an image, thereby increasing the compression factor of the image data.

In order to achieve the above object according to a preferred embodiment of the present invention, there is provided an image compression apparatus for encoding an image in units of blocks, comprising:

size discrimination means for discriminating a block image size suitable for encoding and compressing a predetermined image area;

generation means for dividing the image area to generate a plurality of block images having different sizes on the basis of a discrimination result of the size discrimination means; and compression means for compressing each of block image data representing a block image, generated from the generation means, on the basis of a size of the block image data.

The above and other objects, features, and advantages of the present invention will be apparent from the detailed description of preferred embodiments taken in conjunction with the accompanying drawings.

DETAILED DESCRIPTION OF THE PREFERRED EMBODIMENTS

Figure 1:
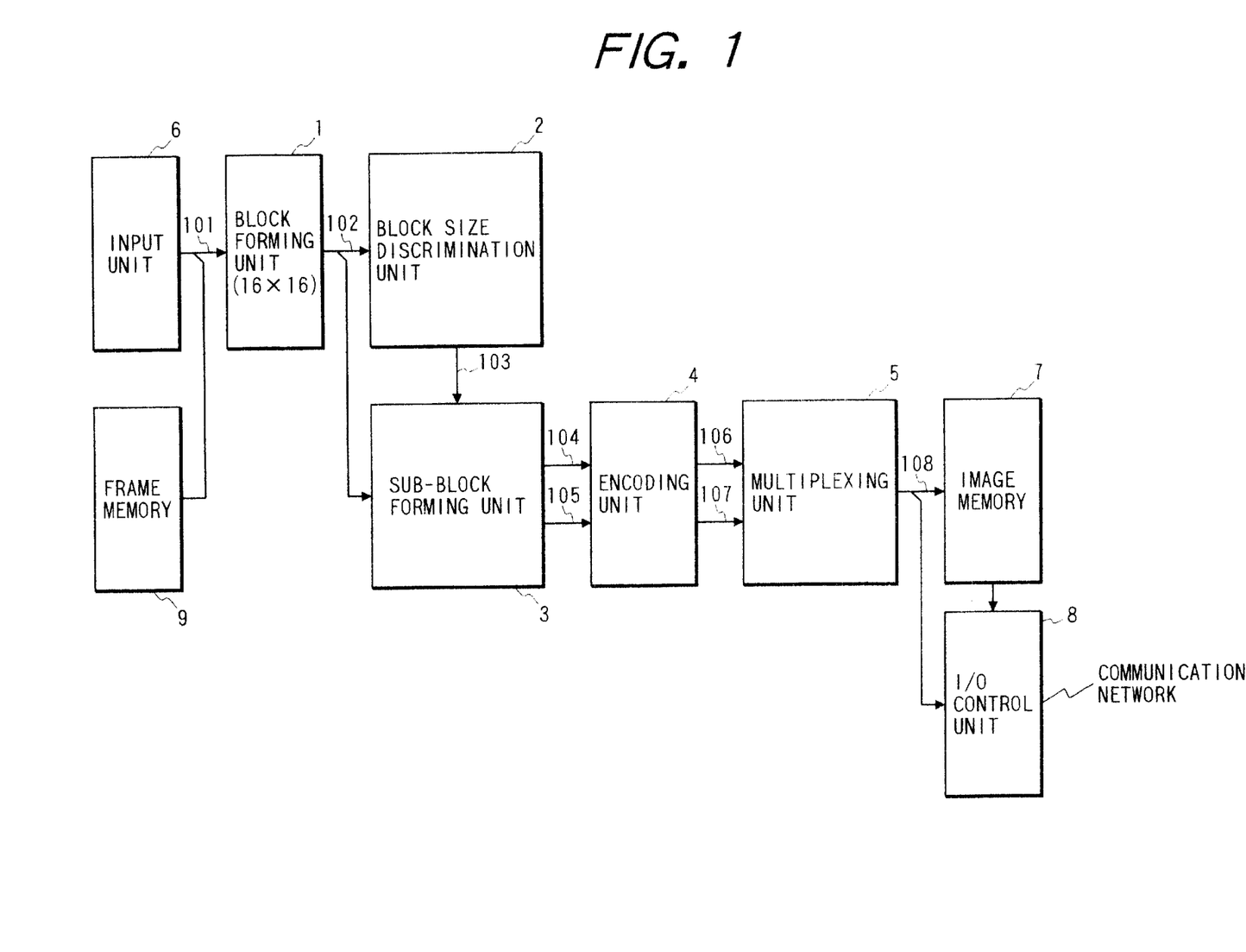
FIG. 1 is a block diagram showing the first embodiment of the present invention.

FIG. 1 is a block diagram showing the first embodiment of the present invention.

Referring to FIG. 1, a block forming unit 1 extracts or forms a block of a predetermined size from image data 101 raster-input from an input unit 6 such as a host computer or an image scanner or already stored in a frame memory 9. The block forming unit 1 then outputs this block data 102. In this embodiment, the block forming unit 1 is constituted by a 16-line line buffer and forms a square block having a size of 16×16 pixels. A block size discrimination unit 2 discriminates whether the block data 102 is to be further divided into sub-blocks having one or a plurality of sizes. The block size discrimination unit 2 outputs division information 103 representing the discrimination result.

A sub-block forming unit 3 divides the block data 102 into sub-blocks having a plurality of sizes, as needed, on the basis of the division information 103 and outputs block or sub-block data 104 and block information 105 associated with the division contents. An encoding unit 4 encodes the block or sub-block data having the respective sizes on the basis of the information 104 and the information 105, and encodes the block information 105 to output encoded data 106 and 107. A multiplexing unit 5 multiplexes the encoded data 106 and 107 in a predetermined order and outputs image-encoded data 108. An image memory 7 stores the encoded data 108 for a plurality of frames. An I/O control unit 8 transmits the encoded data 108 to an external device. The I/O control unit 8 may transmit the encoded data 108 stored in the image memory 7.

The operation of the arrangement shown in FIG. 1 will be described below.

The image data 101 input from the input unit 6 is supplied to the block forming unit 1, and the block forming unit 1 outputs block data 102 consisting of 16 ×16 pixels. This block data 102 is input to the block size discrimination unit 2 and the sub-block forming unit 3. The block size discrimination unit 2 discriminates the feature, e.g., the size of a redundant portion, of the block data 102 and determines whether the block data 102 is to be divided into smaller sub-blocks. In this embodiment, the 16×16 pixel block data is divided into an 8×8 pixel sub-block, a 4×4 pixel sub-block, a 2×2 pixel sub-block, and a 1×1 sub-block in the order named. The size of a redundant portion is determined for a sub-block having each size, thereby determining whether this sub-block is to be divided into a sub-block having a smaller size.

Figure 2:
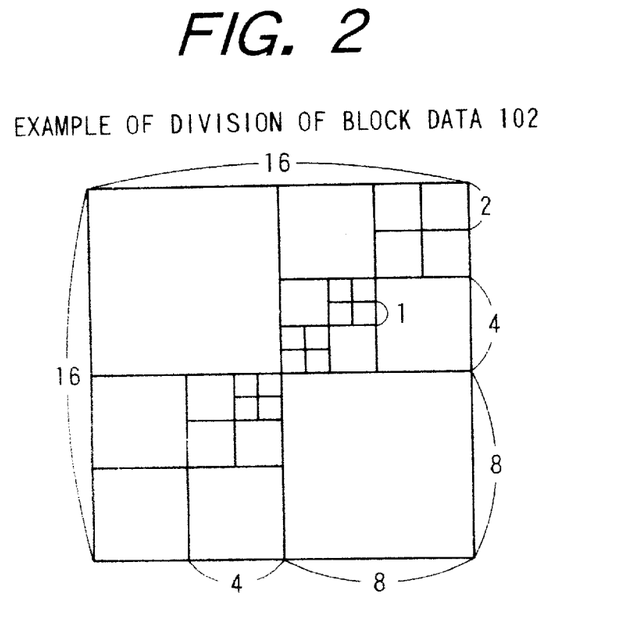
FIG. 2 is a view showing the division of a block into sub-blocks.
Figure 3:
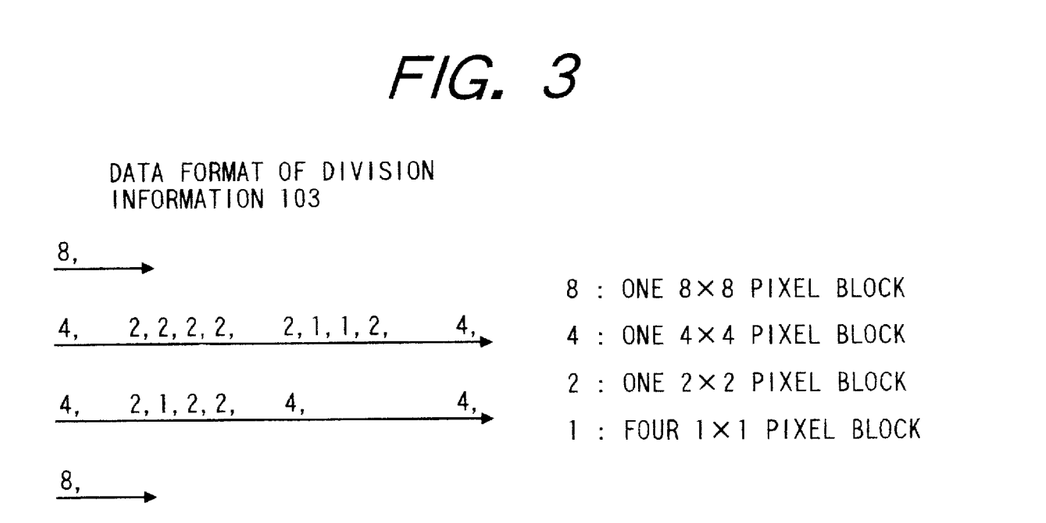
FIG. 3 is a view showing division information 103 representing the division contents in FIG. 2.

The block size discrimination unit 2 outputs the division information 103 obtained in the above discrimination result to the sub-block forming unit 3. Note that the discrimination method is not limited to discrimination of the size of the redundant portion. In addition, an encoding amount obtained upon encoding each block may be compared with a total encoding amount obtained upon encoding a plurality of sub-blocks obtained by dividing the block, and a block size having a smaller encoding amount may be selected, thereby determining an optimal block division method. The sub-block forming unit 3 divides the block data 102, as needed, to form sub-blocks on the basis of the division information 103. In this embodiment, one block data 102 is divided, as shown in FIG. 2, and the above block division processing is performed for one frame. Note that the data format of the 16×16 pixel division information 103 sent from the block size discrimination unit 2 to the sub-block forming unit 2 is shown in FIG. 3. FIG. 3 shows the division information 103 corresponding to the block shown in FIG. 2. FIG. 3 shows numerical values obtained by Z-shaped scanning in units of four large blocks in FIG. 2. These numerical values indicate the sizes of the divided sub-blocks. Note four 1×1 pixel blocks are processed as one data "1". Also note that when the size of the block data 102 is valid as an encoding block size, the block is not divided into sub-blocks, but is output as a 16×16 pixel block.

The sub-block forming unit 3 forms the sub-blocks as described above and outputs the sub-block data 104 and the block information 105 corresponding to the division information 103. The encoding unit 4 compression-encodes the sub-block data 104 and outputs the encoded data 106. At the same time, the encoding unit 4 encodes the block information 105 and outputs its encoded data 107. The multiplexing unit 5 arranges and multiplexes the encoded data 106 and 107 in a predetermined order and outputs the multiplexed data as the image-encoded data 108.

On the decoding side, the image-encoded data 106 can be decoded and expanded on the basis of the encoded data 107 obtained by encoding the block information 105.

As described above, according to this embodiment, the block is divided into sub-blocks on the basis of the redundant portions in the initial block data 102. Each divided portion (sub-block) is compression-encoded to prevent a large change exceeding a predetermined value in each sub-block. For this reason, highly efficient compression processing matching the sizes of redundant portions can be performed.

Sub-block division discrimination processing of the block size discrimination unit 2 which is one of the processing operations described in this embodiment will be described with reference to the flow charts in FIGS. 4 to 7.

Figure 4:
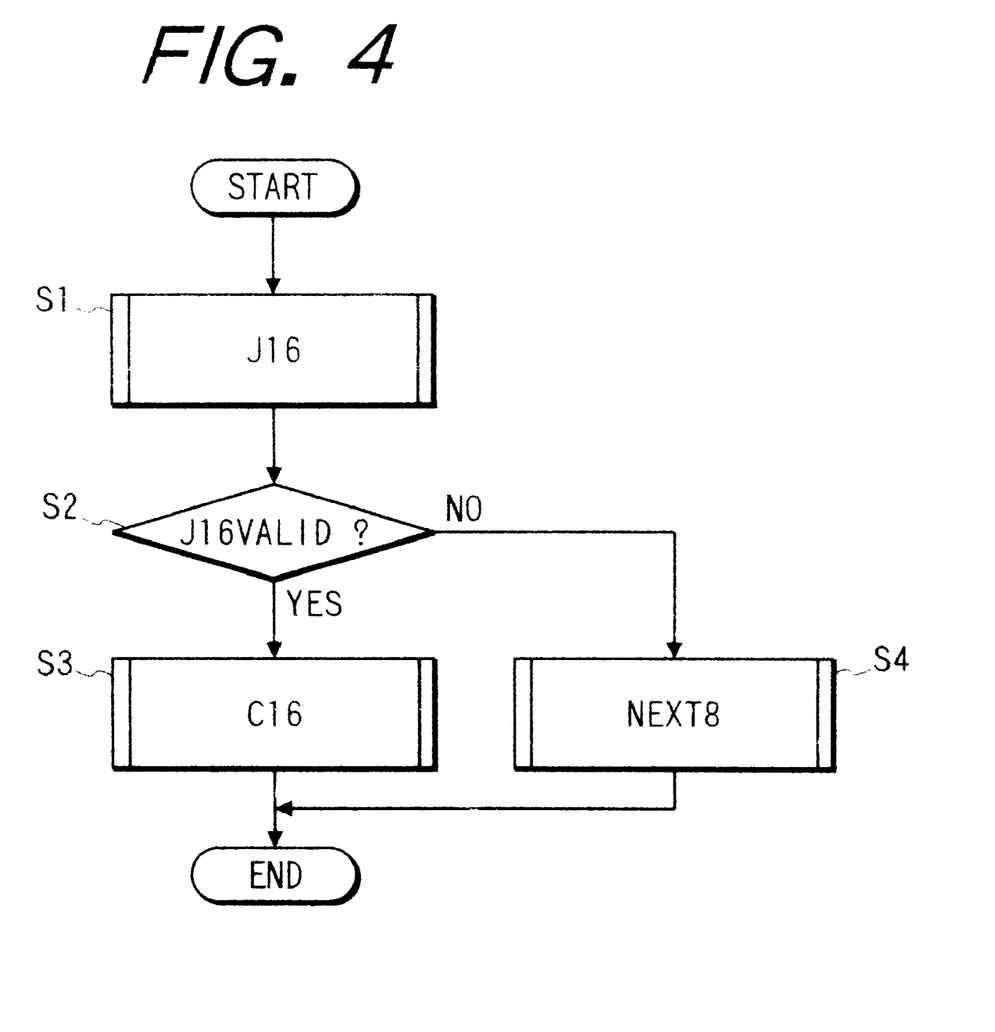
FIG. 4 is a flow chart showing the flow of block division discrimination processing for a block represented by block data 102.

Referring to FIG. 4, processing for forming a 16×16 pixel block (this processing will be referred to as J16 hereinafter) is performed in step S1. It is determined in step S2 whether the block size of 16×16 pixels of the block data 102 is valid as an encoding block size, i.e., whether a redundant portion is large enough to match the size of 16×16 pixels. If it is determined that the redundant portion of the block data 102 is sufficiently large, i.e., the block size is valid, the flow advances to step S3. Processing for outputting the division information 103 representing a value of 16 to the sub-block forming unit 3 is performed (this processing will be referred to as C16 hereinafter). If it is determined that the block size of the block data 102 is not valid, the flow advances to step S4 to perform processing for discriminating whether a sub-block size of 8×8 is valid (this processing will be referred to as NEXT8 hereinafter).

Figure 5:
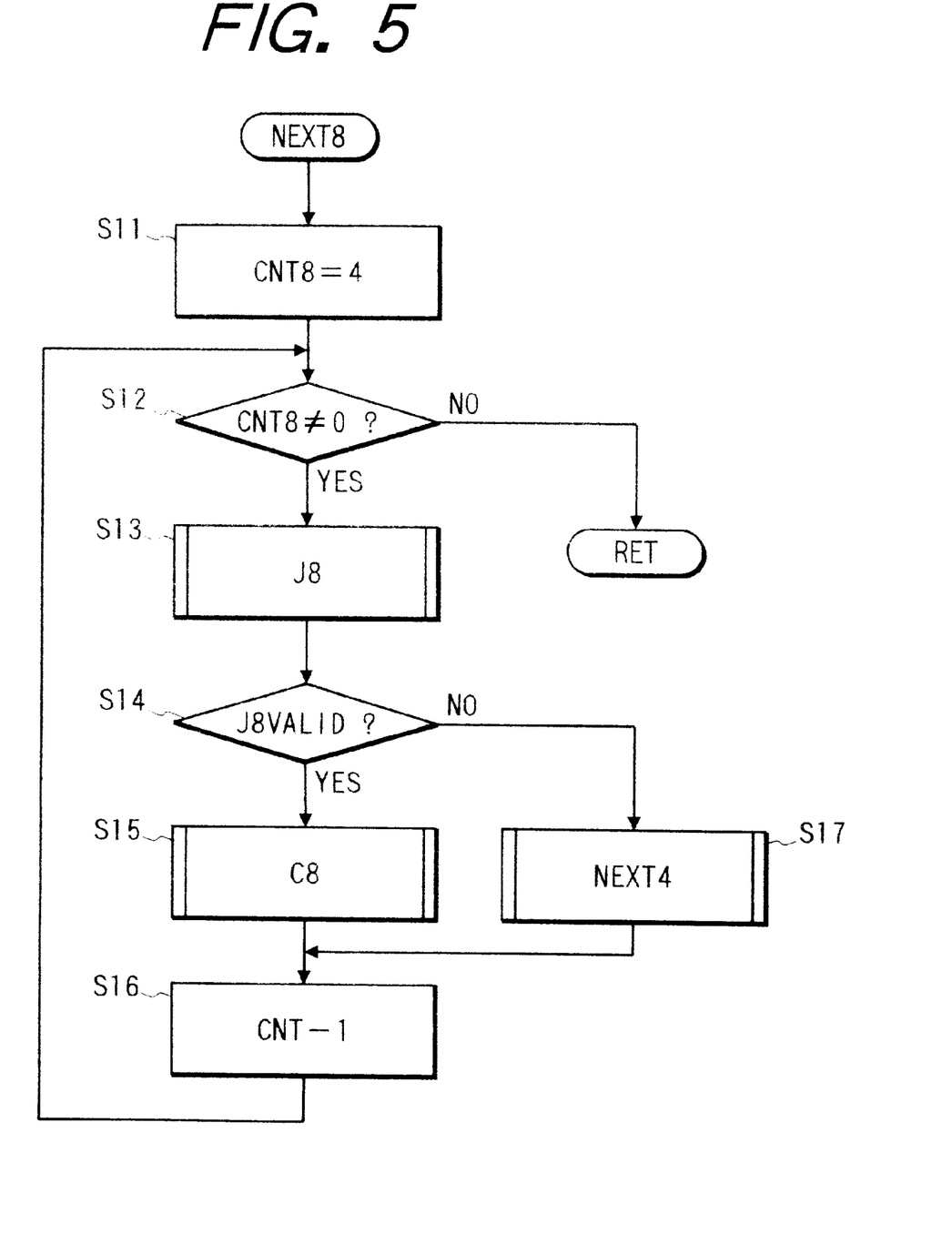
FIG. 5 is a flow chart showing the flow of block division discrimination processing for an 8×8 block.

FIG. 5 shows the flow of processing of NEXT8.

Assume that a 16×16 pixel block is divided into four 8×8 pixel sub-blocks, and that CNT8 as the count value is set to 4 in step S11 so as to scan all the sub-blocks in a Z-shaped manner. In step S12, the count value is checked. If the count value is not zero, the flow advances to step S13 to perform processing for extracting 8×8 pixel sub-blocks (this processing will be referred to as J8 hereinafter). It is determined in step S14 whether the redundant portion of the sub-block is sufficiently large, i.e., whether the sub-block is valid as an encoding block.

If the sub-block is valid, processing for outputting a value of 8 as the division information 103 to the sub-block forming unit 3 is performed (this processing will be referred to as C8 hereinafter).in step S15. In step S16, the count value is decremented by one, and the flow returns to step S12. The processing in steps S12 to S16 is repeated until the count value becomes zero, i.e., until processing for four sub-blocks is completed. When the count value becomes zero, the flow returns to the main routine. If it is determined in step S14 that the sub-block is not valid as an encoding block, the flow advances to step S17 to perform discrimination for determining the encoding block size for a block size of 4×4 pixels as a smaller block size (this discrimination will be referred to as NEXT4 hereinafter).

Figure 6:
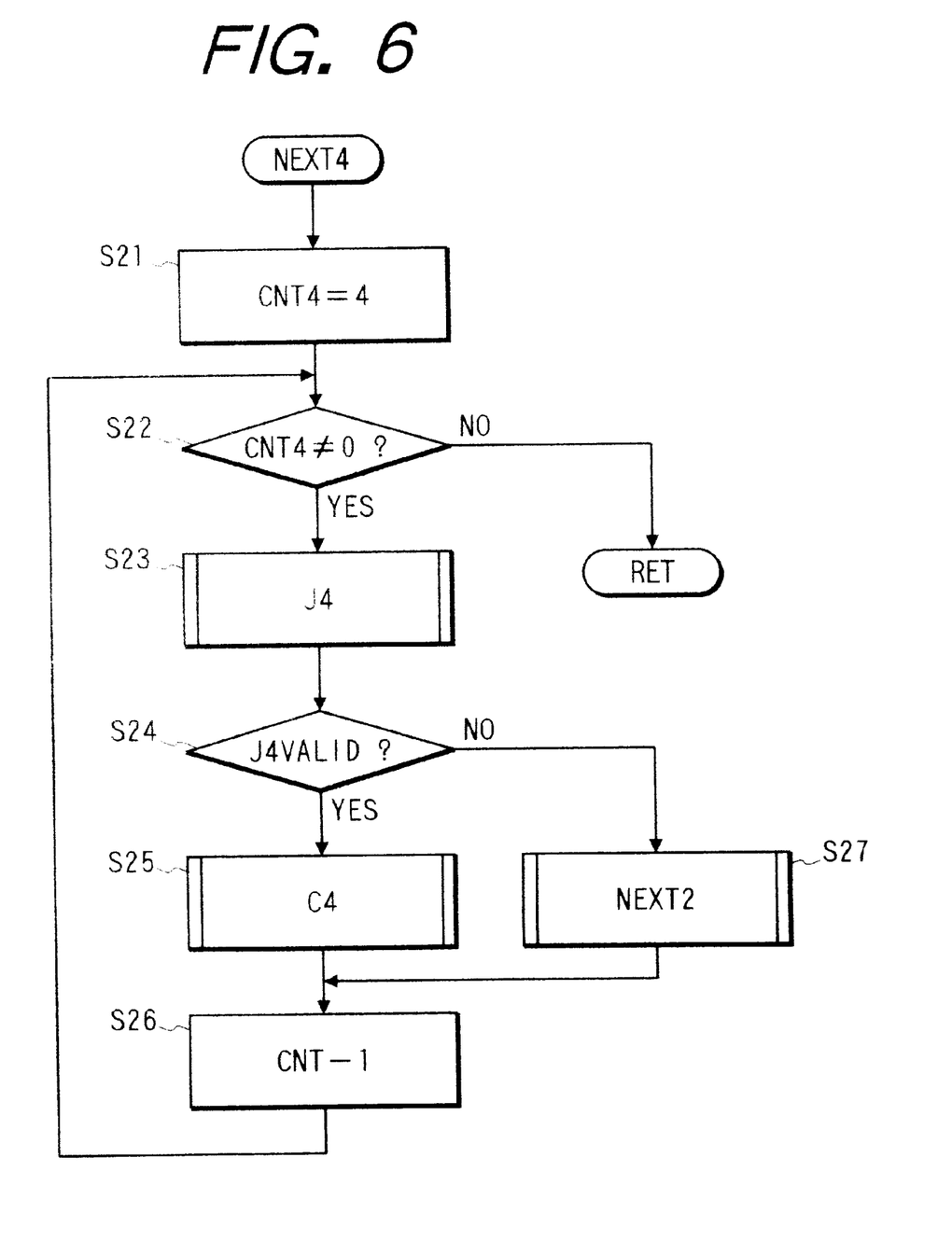
FIG. 6 is a flow chart showing the flow of block division discrimination processing for a 4×4 block.
Figure 7:
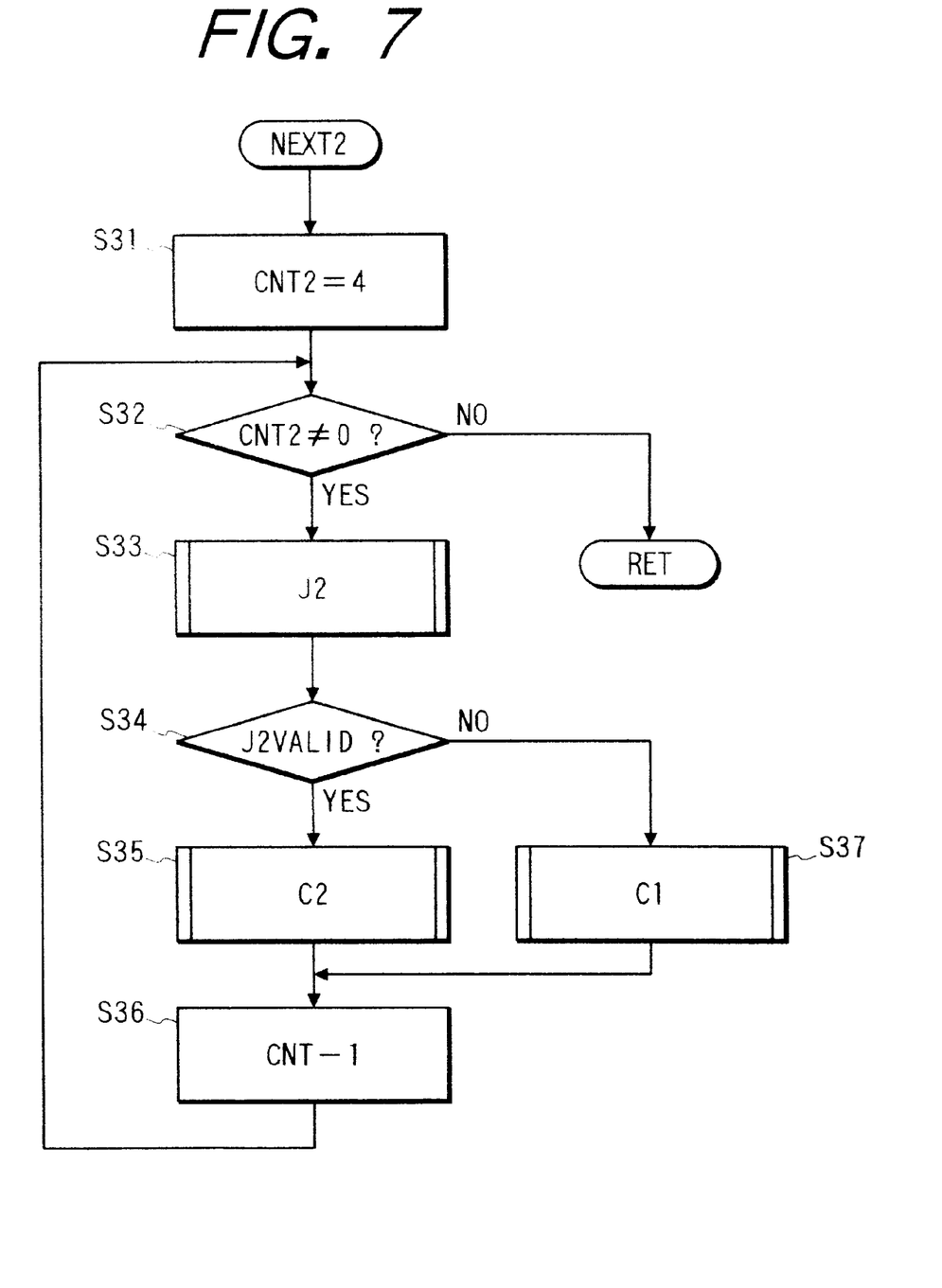
FIG. 7 is a flow chart showing the flow of block division discrimination processing for a 2×2 block.

The above discrimination processing is repeated while the size of the sub-block to be referred to is sequentially reduced. FIG. 6 shows the discrimination processing (NEXT2) for a 2×2 pixel sub-block. Steps S21 to S27 and steps S31 to S37 in FIGS. 6 and 7 correspond to steps S11 to S17 in FIG. 5 and perform the same processing as in FIG. 5.

Discrimination processing operations in steps S2, S14, S24, and S34 in FIGS. 4 to 7, i.e., a method of discriminating whether the block and sub-blocks are valid as encoding blocks, will be described below.

In this discrimination, if the block sizes of the block and sub-blocks are given as n (n=2, 4, 8, 16), the following discrimination equation is used:

$$S = 16 - \left[ \frac{1}{n^2} \sum_j \sum_i p(i,j)^2 - \left\{ \frac{1}{n^2} \sum_j \sum_i p(i,j) \right\}^2 \right]$$

where p(i,j) is the pixel value of a pixel of the ith row and jth column in the block.

The above equation represents comparison between a threshold value of 16 and the variance in an n×n block or sub-block. If the variance is 16 or less, i.e., if S is positive, the block or sub-block is discriminated as a valid encoding block. If S is negative, the block or sub-block is discriminated as an invalid encoding block. A method of calculating the variance is not limited to the above method, but can be obtained as follows. Using the difference $(x-x_i)$ between the average value $(x)$ of the pixels in a block and each pixel $(x_i)$ in the block, the sum of $(x-x_i)^2$ of the pixels in the block may be defined as a variance.

Figure 8:
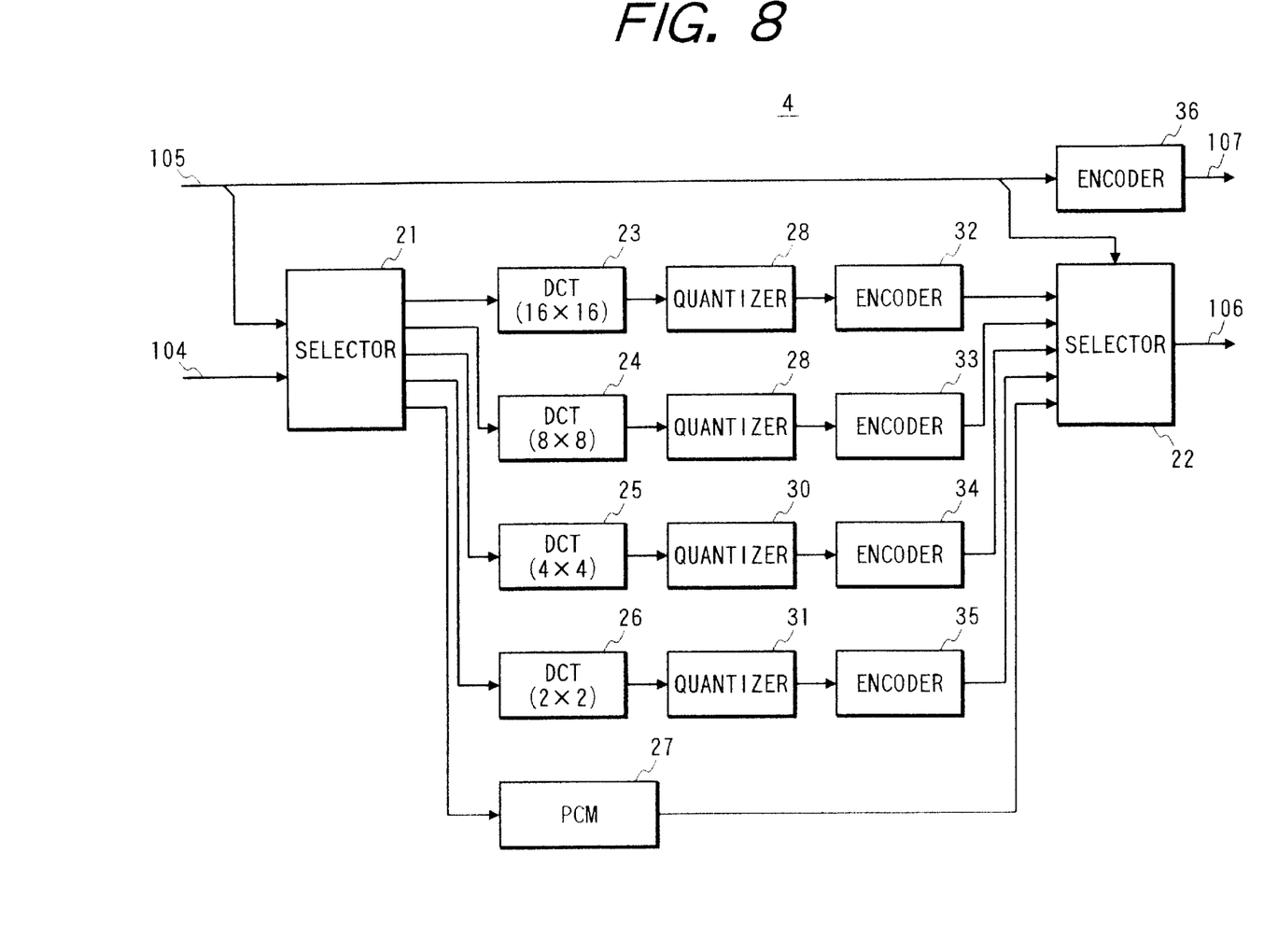
FIG. 8 is a block diagram showing the arrangement of an encoding unit 4.

The arrangement of the encoding unit 4 is shown in FIG. 8.

Referring to FIG. 8, DCT transformer units 23 to 26 perform DCT transform operations of 16×16, 8×8, 4×4, and 2×2 block or sub-block data. A PCM encoder 27 simply PCM-encodes a 1×1 pixel sub-block. Quantizers 28 to 31 quantize DCT coefficients. Encoders 32 to 35 encode the quantized data to obtain encoded data such as a Huffman code. An encoder 36 encodes the block information 105 using the Huffman code to obtain the encoded data 107.

A selector 21 selectively supplies the sub-block data 104 representing the pixel value of the block or sub-block to one of the DCT transformer units 23 to 26 and the PCM encoder 27 in accordance with the block information 105. A selector 22 is switched in correspondence with selection in the selector 21 so as to output the encoded data 106 output from the encoders 32 to 35.

With the above arrangement, the sub-block data 104 representing the block or sub-block input from the sub-block forming unit 3 in FIG. 1 performs DCT transform, quantization, and encoding for a size determined based on the block information 105. The encoded data 107 obtained by encoding the block information 105 is also output.

Figure 9:
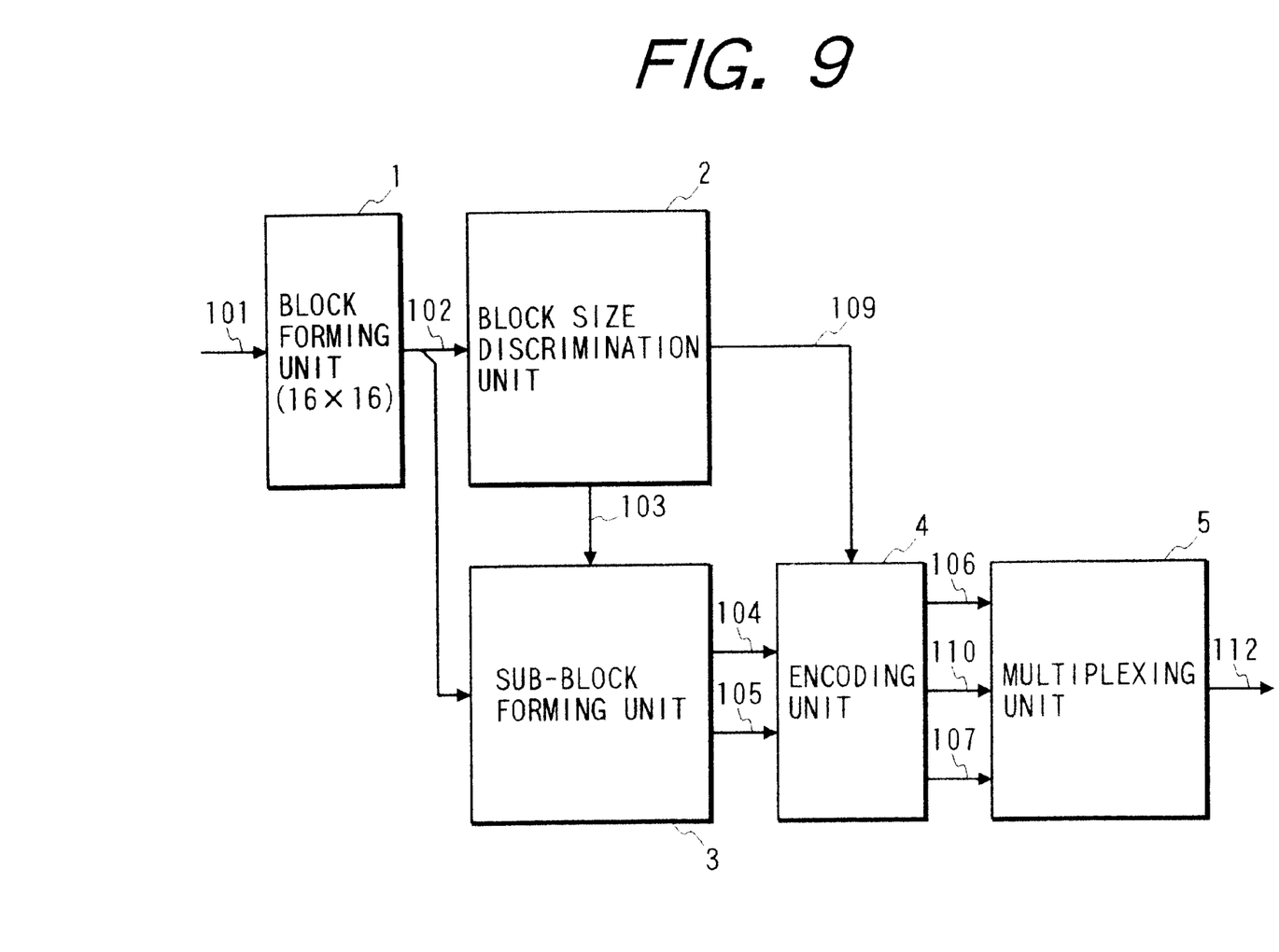
FIG. 9 is a block diagram showing the second embodiment of the present invention.

FIG. 9 shows the second embodiment of the present invention. The arrangement in FIG. 9 is substantially the same as that in FIG. 1, except for a block size discrimination unit 2, so that the arrangements of an encoding unit 4 and a multiplexing unit 5 are different from those in FIG. 1 accordingly.

Portions different from those in FIG. 1 will be mainly described below.

The block size discrimination unit 2 outputs division information 103 and calculates an average value of the pixel values in a block or sub-block. The calculation result is output as average value information 109 to the encoding unit 4. The encoding unit 4 does not perform encoding using DCT transform or the like in encoding sub-block data 104 representing the pixel value of the block or sub-block, but performs differential coding. This encoding method will be described below. The encoding unit 4 calculates the difference value between an average value represented by the average value information 109 and each pixel value of the block, which is represented by the sub-block data 104. Using a Huffman table prepared in advance, such difference value data is Huffman-coded to obtain a Huffman code for each pixel. This Huffman code is output as encoded data 106. The average value information 109 is also encoded by the encoding unit 4 and output as encoded data 110. Block information representing the division size of the block is output as encoded data 107 as in the first embodiment. The multiplexing unit 5 arranges the above three encoded data 106, 107, and 110 in a predetermined order and multiplexes them. The multiplexing unit 5 outputs image-encoded data 112. As described above, since the second embodiment uses the encoding method for calculating the difference between the average value of the pixel values in a block and each pixel value in the block with respect to a 16×16 pixel block or sub-block in an image, the arithmetic operation method in encoding can be simplified.

Differential encoding is performed after the block is divided into sub-blocks each having a block size corresponding to the redundancy of the image. For this reason, the average pixel value of the pixels in a block and each pixel value in the block can be greatly reduced.

According to the embodiment described above, an image is compressed in accordance with the size of a redundant portion of an image in image compression in units of blocks, so that the compression factor can be increased.

More specifically, the encoding block size is locally changed in accordance with the sizes of redundant portions in an image. Even if redundant portions having different sizes are present within one frame, block encoding with a higher compression efficiency can be performed in consideration of the redundant portions having the different sizes.

When differential coding in the second embodiment is performed, the arithmetic operation amount can be reduced as compared with that in the first embodiment, thereby performing highly efficient encoding.

In the first embodiment, each block or sub-block represented by the sub-block data 104 is set as a block having a size suitable for block encoding. When orthogonal transformation is performed in correspondence with the above size for each block or sub-block, the power is concentrated in a low-frequency range in any size, and compression encoding can be facilitated.

In this embodiment, a block having a block size of 16×16 pixels is formed in the first block formation. However, a 32×32 pixel block may be formed. In addition, block formation by the block forming unit 1 need not be performed. Then, if the entire frame is white or the like, the encoding amount can be reduced. Even if the image to be processed is a fine, intricate image, processing as in the above embodiments can be performed, thereby reducing the encoding amount.

In each embodiment described above, when the input unit 6 is a scanner, the processing speed of the units from the block forming unit 1 to the multiplexing unit 5 is set to match the read speed of the scanner. While the parallel processing from the block forming unit 1 to the multiplexing unit 5 is being performed, the I/O control unit 8 may output encoded data to a communication network or read and output the encoded data after it is stored in the image memory 7.

Various changes and modifications may be made within the scope of the appended claims according to the present invention.

What is claimed is:

1. An image compression apparatus for encoding an image in units of blocks, comprising:

size discrimination means for discriminating a block image size suitable for encoding and compressing a predetermined image area of the image, by comparing an encoding amount obtained by encoding the predetermined image area in units of a block of a first size and an encoding amount obtained by encoding the same predetermined image area in units of a block of a second size different from the first size;

generation means for dividing the image area to generate a plurality of block images having different sizes based on a discrimination result of said size discrimination means; and compression means for compressing each block of image data representing a block image generated by said generation means, based on a size of the block of image data.

2. An apparatus according to claim 1, wherein the predetermined image area is a block of n×n pixels (where n is an integer).

3. An apparatus according to claim 1, wherein the predetermined image area is a total area of one frame.

4. An apparatus according to claim 1, wherein said compression means performs compression together with DCT transform of the block image data.

5. An apparatus according to claim 4, wherein said compression means performs compression by quantizing a DCT coefficient generated in the DCT transform.

6. An apparatus according to claim 1, wherein said compression means performs compression by differential coding for generating difference value data in units of pixels in the block and encoding the difference value data.

7. An image compression method of encoding an image in units of blocks, comprising:

a size discrimination step of discriminating a block image size suitable for encoding and compressing a predetermined image area of the image, by comparing an encoding amount obtained by encoding the predetermined image area in units of a block of a first size and an encoding amount obtained by encoding the same predetermined image area in units of a block of a second size different from the first size;

a generation step of dividing the image area to generate a plurality of block images having different sizes based on a discrimination result in said size discrimination step; and a compression step of compressing each block of image data representing a block image generated in said generation step, based on a size of the block of image data.

8. An image processing apparatus comprising:

data generation means for reading an image and generating image data;

size discrimination means for discriminating a block image size suitable for encoding and compressing an image area of at least part on an image represented by the image data, by comparing an encoding amount obtained by encoding the image area in units of a block of a first size and an encoding amount obtained by encoding the same image area in units of a block of a second size different from the first size;

generation means for dividing the image area to generate a plurality of block images having different sizes based on a discrimination result of said size discrimination means; and compression means for compressing each block of image data representing a block image generated by said generation means, based on a size of the block of image data.

9. An apparatus according to claim 8, wherein said generation means and said compression means respectively perform generation and compression in accordance with a read speed of said data generation means.

10. An image processing method comprising:

a data generation step of reading an image and generating image data;

a size discrimination step of discriminating a block image size suitable for encoding and compressing an image area of at least part on an image represented by the image data, by comparing an encoding amount obtained by encoding the image area in units of a block of a first size and an encoding amount obtained by encoding the same image area in units of a block of a second size different from the first size;

a generation step of dividing the image area to generate a plurality of block images having different sizes based on a discrimination result in said size discrimination step; and a compression step of compressing each block of image data representing a block image generated in said generation step, based on a size of the block of image data.

11. An image processing apparatus comprising:

storage means for storing image data of at least one frame;

size discrimination means for discriminating a block image size suitable for encoding and compressing an image area of at least part on an image represented by the image data, by comparing an encoding amount obtained by encoding the image area in units of a block of a first size and an encoding amount obtained by encoding the same image area in units of a block of a second size different from the first size;

generation means for dividing the image area to generate a plurality of block images having different sizes based on a discrimination result of said size discrimination means; and compression means for compressing each block of image data representing a block image generated by said generation means, based on a size of the block of image data.

12. An image processing method comprising:

a storage step of storing image data of at least one frame;

a size discrimination step of discriminating a block image size suitable for encoding and compressing an image area of at least part on an image represented by the image data, by comparing an encoding amount obtained by encoding the image area in units of a block of a first size and an encoding amount obtained by encoding the same image area in units of a block of a second size different from the first size;

a generation step of dividing the image area to generate a plurality of block images having different sizes based on a discrimination result in said size discrimination step; and a compression step of compressing each block of image data representing a block image generated in said generation step, based on a size of the block of image data.

13. An image processing apparatus comprising:

size discrimination means for discriminating a block image size suitable for encoding and compressing a predetermined image area of an image, by comparing an encoding amount obtained by encoding the predetermined image area in units of a block of a first size and an encoding amount obtained by encoding the same predetermined image area in units of a block of a second size different from the first size;

generation means for dividing the image area to generate a plurality of block images having different sizes based on a discrimination result of said size discrimination means;

compression means for compressing each block of image data representing a block image generated by said generation means, based on a size of the block of image data; and communication control means for controlling communication to sent the block of image data compressed by said compression means to another equipment.

14. An apparatus according to claim 13, wherein said communication control means performs communication of the block image data simultaneously with compression by said compression means.

15. An apparatus according to claim 13, wherein said communication control means starts communication of the block image data after compression by said compression means.

16. An image processing method comprising:

a size discrimination step of discriminating a block image size suitable for encoding and compressing a predetermined image area of an image, by comparing an encoding amount obtained by encoding the predetermined image area in units of a block of a first size and an encoding amount obtained by encoding the same predetermined image area in units of a block of a second size different from the first size;

a generation step of dividing the image area to generate a plurality of block images having different sizes based on a discrimination result in said size discrimination step;

a compression step of compressing each block of image data representing a block image generated in said generation means, based on a size of the block of image data; and a communication control step of controlling communication to sent the block of image data compressed in said compression step to another equipment.

17. An image processing apparatus comprising:

size discrimination means for discriminating a block image size suitable for encoding and compressing a predetermined image area of an image, by comparing an encoding amount obtained by encoding the predetermined image area in units of a block of a first size and an encoding amount obtained by encoding the same predetermined image area in units of a block of a second size different from the first size;

generation means for dividing the image area to generate a plurality of block images having different sizes based on a discrimination result of said size discrimination means;

compression means for compressing each block of image data representing a block image generated by said generation means, based on a size of the block of image data; and storage means for storing a plurality of frames of the blocks of image data compressed by said compression means in a predetermined storage unit.

18. An image processing method comprising:

a size discrimination step of discriminating a block image size suitable for encoding and compressing a predetermined image area of an image, by comparing an encoding amount obtained by encoding the predetermined image area in units of a block of a first size and an encoding amount obtained by encoding the same predetermined image area in units of a block of a second size different from the first size;

a generation step of dividing the image area to generate a plurality of block images having different sizes based on a discrimination result in said size discrimination step;

a compression step of compressing each block of image data representing a block image generated in said generation means, based on a size of the block of image data; and a storage step of storing a plurality of frames of the blocks of image data compressed said compression step in a predetermined storage unit.

* * * * *

UNITED STATES PATENT AND TRADEMARK OFFICE
CERTIFICATE OF CORRECTION

PATENT NO. : 5,903,669

DATED : May 11, 1999

INVENTOR(S) : YASUJI HIRABAYASHI

It is certified that error appears in the above-identified patent and that said Letters Patent is hereby corrected as shown below:

<u>COLUMN 7</u>

Line 34, "on" should read --of--; and
Line 58, "on" should read --of--.

<u>COLUMN 8</u>

Line 9, "on" should read --of--;
Line 26, "on" should read --of--; and
Line 58, "sent" should read --send--.

<u>COLUMN 9</u>

Line 18, "sent" should read --send--.

<u>COLUMN 10</u>

Line 29, "compressed" should read --compressed by--.

Signed and Sealed this

Twenty-third Day of November, 1999

Attest:

Q. TODD DICKINSON

*Attesting Officer*   *Acting Commissioner of Patents and Trademarks*